US010543753B2

(12) United States Patent
Wechsler et al.

(10) Patent No.: US 10,543,753 B2
(45) Date of Patent: Jan. 28, 2020

(54) INDUCTIVE POWER TRANSFER PAD AND METHOD OF OPERATING AN INDUCTIVE POWER TRANSFER PAD WITH SCISSOR LIFT MEANS FOR MOVING A PRIMARY COIL

(71) Applicant: Bombardier Primove GmbH, Berlin (DE)

(72) Inventors: Simon Wechsler, Mannheim (DE); Roman Gunt, Heidelberg (DE); Robert Schuele, Boblingen (DE)

(73) Assignee: Bombardier Primove GmbH, Berlin (DE)

( * ) Notice: Subject to any disclaimer, the term of this patent is extended or adjusted under 35 U.S.C. 154(b) by 16 days.

(21) Appl. No.: 15/755,780

(22) PCT Filed: Aug. 29, 2016

(86) PCT No.: PCT/EP2016/070318
§ 371 (c)(1),
(2) Date: Feb. 27, 2018

(87) PCT Pub. No.: WO2017/037021
PCT Pub. Date: Mar. 9, 2017

(65) Prior Publication Data
US 2019/0023139 A1    Jan. 24, 2019

(30) Foreign Application Priority Data

Aug. 28, 2015 (GB) .................................. 1515332.3

(51) Int. Cl.
*B60L 53/12*    (2019.01)
*B60L 53/38*    (2019.01)
(Continued)

(52) U.S. Cl.
CPC ............ *B60L 11/1829* (2013.01); *B60L 53/12* (2019.02); *B60L 53/38* (2019.02); *B60L 53/39* (2019.02);
(Continued)

(58) Field of Classification Search
CPC ......... B60L 53/12; B60L 53/38; B60L 53/39; H02J 50/10; H02J 50/90; H02J 7/025;
(Continued)

(56) References Cited

U.S. PATENT DOCUMENTS 5,654,621 A      8/1997  Seelig
2010/0235006 A1  9/2010  Brown
(Continued)

FOREIGN PATENT DOCUMENTS

CN    101734574 A    6/2010
CN    102786011 A    11/2012
(Continued)

*Primary Examiner* — Hal Kaplan
(74) *Attorney, Agent, or Firm* — The Webb Law Firm

(57) ABSTRACT

The invention relates to an inductive power transfer pad, in particular a transfer pad of a system for inductive power transfer to a vehicle, including a stationary part and a movable part, wherein the movable part includes a primary winding structure, wherein the inductive power transfer pad includes at least one actuating means, wherein the movable part is movable at least in a first direction by the at least one actuating means, wherein the inductive power transfer pad includes a scissor lift means, wherein the movable part and the stationary part are coupled by the scissor lift means, wherein a scissor arrangement of the scissor lift means is coupled to the stationary part by at least one fixed bearing, wherein the scissor arrangement is coupled to the movable part by at least one floating bearing, and a method of operating an inductive power transfer pad.

26 Claims, 4 Drawing Sheets

(51) Int. Cl.
    *B60L 53/39*        (2019.01)
    *H02J 50/10*        (2016.01)
    *H02J 50/90*        (2016.01)
    *H02J 7/02*         (2016.01)
    *B60L 11/18*        (2006.01)

(52) U.S. Cl.
    CPC .............. *H02J 7/025* (2013.01); *H02J 50/10* (2016.02); *H02J 50/90* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
    CPC . Y02T 10/7005; Y02T 10/7072; Y02T 90/12; Y02T 90/121; Y02T 90/122; Y02T 90/125; Y02T 90/14
    USPC .......................................................... 307/104
    See application file for complete search history.

(56) References Cited

U.S. PATENT DOCUMENTS

| | | |
|---|---|---|
| 2012/0181981 A1 | 7/2012 | Wechlin et al. |
| 2013/0033227 A1 | 2/2013 | Gibbons, Jr. |
| 2013/0249470 A1 | 9/2013 | Martin et al. |
| 2015/0051750 A1 | 2/2015 | Kurs et al. |
| 2015/0224882 A1 | 8/2015 | Brill et al. |

FOREIGN PATENT DOCUMENTS

| | | |
|---|---|---|
| CN | 203528638 U | 4/2014 |
| CN | 203529307 U | 4/2014 |
| CN | 204633439 U | 9/2015 |
| DE | 102007033654 A1 | 4/2008 |
| DE | 102010042395 A1 | 4/2012 |
| EP | 0788212 A2 | 8/1997 |
| GB | 2512864 A | 10/2014 |
| WO | 2011127455 A2 | 10/2011 |
| WO | 2014029439 A1 | 2/2014 |
| WO | 2015128450 A1 | 9/2015 |

INDUCTIVE POWER TRANSFER PAD AND METHOD OF OPERATING AN INDUCTIVE POWER TRANSFER PAD WITH SCISSOR LIFT MEANS FOR MOVING A PRIMARY COIL

CROSS-REFERENCE TO RELATED APPLICATIONS

This application is the United States national phase of International Application No. PCT/EP2016/070318 filed Aug. 29, 2016, and claims priority to United Kingdom Patent Application No. 1515332.3 filed Aug. 28, 2015, the disclosures of which are hereby incorporated in their entirety by reference.

BACKGROUND OF THE INVENTION

Field of the Invention

The invention relates to an inductive power transfer pad and a method of operating an inductive power transfer pad.

Description of Related Art

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of e.g. three-phase windings. A first set is installed on the ground (primary windings or primary winding structure) and can be fed by a wayside power converter (WPC). The second set of windings (secondary winding structure) is installed on the vehicle. For example, the second set of windings can be attached underneath the vehicle, in the case of trams under some of its wagons. For an automobile it can be attached to the vehicle chassis. The second set of windings or, generally, the secondary side is often referred to as pick-up-arrangement or receiver. The first set of windings and the second set of windings form a high frequency transformer to transfer electric energy to the vehicle. This can be done in a static state (when there is no movement of the vehicle) and in a dynamic state (when the vehicle moves).

In particular in the case of road automobiles, a stationary primary unit comprises a plurality of elements which are often arranged spatially separated.

GB 2512864 A discloses an inductive power transfer pad, in particular an inductive power transfer pad of a system for inductive power transfer to a vehicle, comprising a housing, a primary winding structure, a connecting terminal, wherein the inductive power transfer pad further comprises an inverter, wherein the inverter is arranged within the housing, wherein an input side of the inverter is electrically coupled to the connecting terminal and an output side of the inverter is electrically coupled to the primary winding structure.

Also known are inductive power transfer systems which comprise a movable primary element. U.S. Pat. No. 5,654, 621 A discloses an inductive transmitter having a primary element and a secondary element which is attached to the vehicle, wherein the primary element is power driven to move in all three spatial coordinates with a predetermined spatial area.

DE 102010042395 A1 discloses a system for inductive charging of a battery of a vehicle, wherein a primary coil is automatically placeable.

DE 102007033654 A1 discloses a base unit with a driving means to reduce a distance between a primary conductor and a secondary coil.

US 2010/0235006 A1 discloses a movable automated charging apparatus comprising a base, a scissor lift, a pedestal, a joint and a charger. The charger is configured to mate with a vehicle receptacle physically or via proximity.

PCT/EP2015/054106 (PCT application number, not yet published) discloses an inductive power transfer pad comprising a stationary part and a movable part, wherein the movable part comprises a primary winding structure, wherein the movable part is movable between a retracted state and an extended state. Further, the inductive power transfer pad is designed and/or controllable such that the movable part is only movable to a position from a set of predetermined positions, wherein the set of predetermined positions is a subset of all positions between the retracted and the extended state.

There is the technical problem of providing an inductive power transfer pad and a method of operating such an inductive power transfer pad which allow a reliable movement between an extended and a retracted state, in particular in the case of soiling and/or icing of the inductive power transfer pad.

SUMMARY OF THE INVENTION

The solution to said technical problem is provided by the subject-matter with the features of the present invention.

An inductive power transfer pad, in particular a transfer pad of a system for inductive power transfer to a vehicle, is proposed.

An inductive power transfer pad, in particular a transfer pad of a system for inductive power transfer to a vehicle, is proposed. The inductive power transfer pad (IPT pad) can be part of a primary unit of a system for inductive power transfer. The power transfer pad comprises a stationary part and a movable part, wherein the movable part comprises a primary winding structure. The primary winding structure generates an alternating (electro-) magnetic field if the primary winding structure is energized or supplied with an operating current.

Further, the movable part can be movable between a retracted state and an extended state. The power transfer pad can comprise at least one actuating means, wherein the movable part is movable by the at least one actuating means. In the context of this invention, the term "actuating means" can denote an entity of all components or elements by which the movement of the movable part is generated. The term "actuating means" can thus comprise at least one actuator and/or at least one lifting mechanism. Further, the actuating means can comprise coupling means for mechanically coupling the actuator and the lifting means and/or at least one guiding means for guiding the movement of the movable part.

The actuating means can be coupled to the movable part. It is possible that the actuating means is directly coupled to the movable part, wherein a driving force generated by the actuating means can directly be exerted onto the movable part. Alternatively, the actuating means can be coupled to the movable part via the scissor lift means. In this case, the driving force generated by the actuating means can be exerted onto the scissor lift means and thus be transferred to the movable part. The movable part can be movable at least into a first direction, in particular by the at least one actuating means. The first direction can be oriented parallel to a main propagation direction of the electromagnetic field generated by the primary winding structure. In particular, the first direction can be oriented perpendicular to the bottom surface of the power transfer pad or a surface of the ground on which the power transfer pad is mounted, wherein the first direction is directed away from the ground. In the retracted state, an upper surface of the movable part can be arranged within the same plane as an upper surface of the stationary part.

In the context of this invention, the first direction can also be defined as a vertical direction. In the following, terms as "upper", "lower", "above", "under", "lowest", "highest", "bottom" refer to the vertical direction.

In the retracted state, the movable part, in particular an upper surface of the movable part, can be positioned at a retracted position, in particular with respect to the first direction, e.g. a predetermined lowest vertical position. In the retracted state, a height of the power transfer pad, i.e. a distance of the highest portion of the power transfer pad, e.g. the upper surface of the movable part, from a mounting portion of the power transfer pad along the first direction can be minimal. Correspondingly, in the retracted state, the movable part, in particular an upper surface of the movable part, can be positioned at an extended position, e.g. a predetermined highest vertical position. In the extended state, the height of the power transfer pad can be maximal. The mounting portion can correspond to a bottom surface of the power transfer pad. The mounting portion can be used to mount the power transfer pad to a mounting structure, in particular to a surface of a route. Retracted state and the extended state can be defined by mechanical elements, e.g. stop elements, and/or by the design of the actuating means.

The height in the retracted state can be chosen from an interval from 50 mm to 110 mm, in particular from an interval from 70 mm to 90 mm. Preferably, the height in the retracted state can be equal to 65 mm. The height in the extended state can e.g. be chosen from an interval of 95 mm to 280 mm. Preferably, the height in the extended state can be equal to 230 mm.

Further, the power transfer pad can be designed and/or controllable such that the movable part is only movable (or movable only) to a position from a set of predetermined positions, wherein the set of predetermined positions is a subset of the set of all positions between the retracted and the extended state. In other words, the movable part can only be movable to a set of selected discrete positions along the range of all theoretically possible positions between the retracted state and the extended state. The set of predetermined positions can comprise at least the position of the movable part in the retracted state and the position of the movable part in the extended state. In addition, the set of predetermined position can comprise one or more, but not all, positions between the position of the movable part in the retracted state and the position of the movable part in the extended state.

The positions can denote positions along a trajectory of the movable part, wherein the movable part is moved along said trajectory from the retracted state to the extended state and vice versa. Also, the positions can denote positions with respect to the aforementioned first direction, e.g. vertical positions.

The power transfer pad can e.g. comprise at least one position sensing means for determining the position of the movable part. Depending on the sensed position of the movable part, the movement can be controlled, e.g. by a control unit, such that the movable part is moved to a selected position from a set of predetermined positions.

Alternatively or in addition, the power transfer pad, in particular the movable part, more particular at least one lifting or guiding means or mechanism for guiding the movement of the movable part, can comprise at least one, preferably multiple, stop element(s), wherein the at least one stop element is designed and/or arranged such that the movement of the movable part is restricted to a movement into the positions of the set from predetermined positions. The at least one stop element can e.g. be a mechanical element.

This advantageously allows a simple design of the power transfer pad and/or implementation of the motion control.

Further, it is possible that the movable part is only movable to the retracted state or to the extended state. In other words, the movable part is only movable to the position of the movable part in the retracted state, i.e. the retracted position, and to the position of the movable part in the extended state, i.e. the extended position. This means that the set of predetermined positions comprises only two positions.

This advantageously further simplifies the design of the power transfer pad and/or implementation of the motion control.

Further, the movable part is, in particular only, movable in steps. The movement of the movable part can e.g. be a one-step movement, e.g. a movement between the retracted state and the extended state and vice versa, or a multiple-step movement. If the movement is a multiple-step movement, the steps can have equal length or can have different lengths.

Preferably, however, there are no predetermined positions for the lifting mechanism. This means the movable part can be moved to each position between the retracted and the extended state. A positioning tolerance can e.g. be +/−1 mm.

The movable part is movable at least in the first direction by the at least one actuating means. Further, the movable part can be movable against the first direction, e.g. also by the at least one actuating means. A movement in the first direction can also be referred to as upward movement or lifting movement. A movement against the first direction can also be referred to as downward or lowering movement. The inductive power transfer pad comprises a scissor lift means or mechanism, wherein the movable part and the stationary part are coupled by the scissor lift means. In particular, the movable part and the stationary part are movably coupled by the scissor lift means. In the context of this invention, the term "coupling" can refer to a mechanical coupling or mechanical connection.

The scissor lift means can comprise one, preferably two, scissor arrangement/s. Preferably, the scissor lift means can comprise one scissor arrangement per longitudinal side of the movable part. Each scissor arrangement can comprise two scissor leg elements. The two scissor leg elements of one scissor arrangement can be movably connected or coupled. Preferably, all scissor leg elements of the scissor lift means are provided as common parts. This means that all scissor leg elements are designed similar.

The scissor lift means can be used to guide the movement between the retracted and the extended state. A driving force for the execution of said movement can be exerted onto the scissor lift means or directly onto the movable part.

Further, a scissor arrangement of the scissor lift means is coupled to the stationary part by at least one fixed bearing, wherein the scissor arrangement is coupled to the movable part by at least one floating bearing.

Preferably, the scissor arrangement of the scissor lift means is coupled to the stationary part by multiple, e.g. four, fixed bearings, wherein the scissor arrangement is coupled to the movable part by multiple, e.g. four, floating bearings.

It is also possible that the scissor arrangement of the scissor lift means is coupled to the stationary part by at least one, e.g. two, floating bearing/s and by at least one, e.g. two, fixed bearing/s. Further, the scissor arrangement can be coupled to the movable part by at least one, e.g. two, floating bearing/s and by at least one, e.g. two, fixed bearing/s.

In particular, the scissor arrangement of the scissor lift means can be coupled to the stationary part and to the movable part by four bearings, respectively.

In this case all of the bearings for coupling the scissor arrangement to the stationary part can be designed as fixed bearings. Further, all of the bearings for coupling the scissor arrangement to the movable part can be designed as floating bearings.

Alternatively, two of the bearings for coupling the scissor arrangement to the stationary part can be designed as fixed bearings, wherein the remaining bearings are designed as floating bearings. Further, two of the bearings for coupling the scissor arrangement to the movable part can be designed as fixed bearings, wherein the remaining bearings are designed as floating bearings. In this case, each scissor arrangement can be coupled to the stationary part by one fixed bearing and one floating bearing, wherein the scissor arrangement can be coupled to the movable part by one fixed bearing and one floating bearing.

Further, the fixed bearings for coupling the scissor arrangement to the stationary part can be arranged opposite to the movable bearings for coupling the scissor arrangement to the movable part, wherein the movable bearings for coupling the scissor arrangement to the stationary part can be arranged opposite to the fixed bearings for coupling the scissor arrangement to the movable part. In this case and with respect to a longitudinal direction of the inductive power transfer pad, the floating bearing of one scissor arrangement for coupling said scissor arrangement to the stationary or movable part can be a rear-sided or front-sided bearing.

A fixed bearing can denote a bearing which does not allow a translational movement of the beared or mounted part of the scissor arrangement, e.g. of a scissor leg element. However, a rotational movement of the beared or mounted part can be allowed by the fixed bearing. For example, a scissor leg element can be pivotally coupled to the fixed bearing.

A floating bearing can allow a translational movement of the beared or mounted part of the scissor arrangement along one or more spatial direction(s). Further, the floating bearing can also allow a rotational movement of the beared part. For example, the scissor leg element can also be pivotally coupled to the floating bearing.

Preferably, a floating bearing is partially provided by an elongated hole within the movable part, wherein a guided element of a scissor leg element or connected to the scissor leg element is movably arranged within the elongated hole. The elongated hole provides a guiding slot for the guided element in and against one or more spatial direction(s).

Providing the connection to the movable part via floating bearings advantageously allows preventing dirt accumulation at the floating bearings since they are not arranged in the vicinity of the stationary part where dirt can accumulate easier. Additionally it allows a horizontal movement of the movable part, e.g. due to a manual operation or due to an exposure to an external load. Thus, the risk of damage to the lifting mechanism can be reduced.

According to the invention, the actuating means is designed as a self-locking actuating means. In this case, the actuating means can be coupled to the movable part such that holding force or holding torque for the movable part is provided, in particular in a standstill of the movable part. The holding force or holding torque may be at least partially or fully provided by the self-locking effect. In order to move the movable part, it is necessary to overcome the holding force or holding torque provided by the self-locking effect. An example of a self-locking actuating means is a linear motor with an outer braking ring force-fittingly convoluting or encompassing a movable output shaft of the linear motor. In this case, the outer ring exerts a braking and/or a holding force on the movable output shaft, preferably at all times or in all positions of the movable output shaft.

The actuating means can comprise a driving unit, wherein the driving unit generates a driving force or driving torque. The actuating means can also comprise coupling means or transmission means for transmitting the driving force or driving torque to the movable part.

It is possible that the self-locking effect, e.g. the self-locking force or self-locking torque, is provided by driving unit. Alternatively or in addition, the self-locking effect can be provided by the coupling means, e.g. by a self-locking transmission or a self-locking gear.

The movable part can be moved to a desired position, e.g. to the extended state, by operating the actuating means. During the operation of the actuating means, the actuating means generates or provides the driving force/torque in order to move the movable part into the desired position. The driving force/torque can be generated such that the holding force/torque is overcome.

Once the desired position is reached, operation of the actuating means can be terminated or stopped or interrupted. This means, that no driving force/torque is provided or generated by the actuating means after the desired position of the movable part is reached. Alternatively, the actuating means can be operated such that a force/torque smaller than the driving force/torque can be provided or generated by the actuating means after the desired position of the movable part is reached.

The holding force/torque provided by the self-locking effect counteracts a (further) movement of the movable part. In particular, the self-locking effect, e.g. the holding force/torque, can be provided such that no additional force/torque or only a reduced force/torque needs to be generated by the actuating means in order to keep or hold the movable part in the desired position.

In particular, the self-locking actuating means can be arranged and/or designed such that the movable part is holdable in one or more selected position(s) or in all positions of the movable part without operating the actuating means or while operating the actuating means with a reduced power consumption in comparison to an operation in which a driving force/torque is generated.

This advantageously allows to significantly reducing a power consumption required for the operation of actuating means. In the proposed embodiment, no or only a reduced power is consumed for holding the movable part in the desired position.

In another embodiment, the inductive power transfer pad comprises at least one spring element, wherein the at least one spring element is part of the coupling, in particular the mechanical coupling, between the movable part and the stationary part.

That the at least one spring element is part of the coupling between the movable part and the stationary part does not necessarily mean that the at least one spring element is directly connected to the movable part and/or to the stationary part. It is, however, possible that the at least one spring element is directly connected to the movable part and/or the stationary part.

That the at least one spring element is part of the coupling between the movable part and the stationary part can e.g. mean that a status of the at least one spring element, in particular a spring force provided by the at least one spring element, changes if the movable part is moved. In other words, the at least one spring element can provide at least a part of the mechanical coupling between the movable part and the stationary part.

Providing at least one spring element as part of the coupling between the movable part and the stationary part advantageously allows supporting the at least one actuating means during the movement of the movable part. In particular, the at least one spring element can be designed and/or arranged such that a driving force (or torque) for moving the movable part can be reduced in comparison to a driving force/torque in an embodiment without the at least one spring element.

In another embodiment, at least one section of the scissor lift means, e.g. one section or element of a scissor arrangement, is, in particular directly, connected to the stationary part by the at least one spring element. Alternatively, at least one section of the scissor lift means is, e.g. directly, connected to the movable part by the at least one spring element.

This can e.g. mean that one end of the spring element is, e.g. directly, connected to the at least one section of the scissor lift means and that another end of the spring element is, e.g. directly, connected to the stationary part or to the movable part.

The scissor lift means can e.g. comprise a central connecting element which couples a first and a further scissor arrangement of the scissor lift means. In this case, the central connecting element can be connected to the stationary part or to the movable part by the at least one spring element.

This advantageously allows in simple installation of the at least one spring element within the inductive power transfer pad.

In another embodiment, the at least one actuating means comprises at least on braking means for a movable part of the actuating means. The braking means can e.g. be an active or a passive braking means. An active braking means can require external energy for providing or generating a braking force/torque. A passive braking means can require no external energy for providing or generating a braking force/torque. In particular, the at least one braking means can e.g. be a friction-based braking means.

If the movable part of the actuating means is movable in more than one direction, e.g. for moving the movable part from the retracted into the extended state or vice versa, the braking means can provide a braking force during the movement in each direction.

The braking means can provide a constant braking force/torque. The braking means can provide the self-locking effect or at least a portion thereof. In other words, the braking means can generate the holding force/torque. Thus, the actuating means, in particular a self-locking actuating means, can comprise the braking means.

Providing a braking means advantageously also allows to reduce a force/torque provided by the at least one actuating means, in particular a force/torque required to hold or keep the movable part in a desired position. This reduces an energy required for the operation of the actuating means.

In another embodiment, the at least one spring element is arranged and/or designed such that the movable part is holdable in selected or in all positions of the movable part without operating the actuating means.

This means that the movable part can be moved to a desired position, e.g. to the extended state, by operating the actuating means. During the operation of the actuating means, the actuating means generates or provides a force/torque in order to move the movable part into the desired position. Once the desired position is reached, operation of the actuating means can be terminated or stopped or interrupted. This means, that no force/torque is provided or generated by the actuating means after the desired position of the movable part is reached. However, a spring force generated by the at least one spring element is provided such that the movable part keeps or holds the movable part in the said desired position.

The design and/or arrangement of the at least one spring element can e.g. depend on an own weight of the movable part and an additional weight applied to the movable part, e.g. the weight of snow or dirt. Preferably, the at least one spring element is arranged and/or designed such that the movable part is holdable in all possible positions of the movable part without operating the actuating means. The position in which the movable part can be held can, however, can comprise only a subset of all possible positions of the movable part.

This advantageously allows to significantly reducing a power consumption required for the operation of actuating means. In the proposed embodiment, power is consumed only for changing a position of the movable part but not for holding the movable part in said position, in particular during a charging process.

In another embodiment, the at least one spring element and the at least one braking means are arranged and/or designed such that the movable part is holdable in selected or in all positions of the movable part without operating the actuating means. In other words, in addition to the design and/or arrangement of the spring element, the braking means is designed or arranged such that the desired position keeping is provided. This advantageously allows to further reducing the power consumption. Further an operational safety or inductive power transfer pad, in particular during the movement and position keeping of the movable part is improved.

In another embodiment, a floating bearing is at least partially provided by an elongated guiding slot within the movable part. The elongated guiding slots are used for guiding a movement of an upper end section of a scissor leg element. It is for instance possible that a guided element is movably, in particular pivotally, coupled to the upper end section of the scissor leg element. The guided element can be movably arranged within the elongated guiding slot.

In particular, the elongated guiding slots can provide a linear guiding for the upper end section of the scissor leg element.

This advantageously provides a design which can easily be constructed and thus reduces a construction effort and building costs.

In another embodiment, an upper end section of at least one scissor leg element is in a stop position if the movable part is in the extended state. The stop position can denote a position of the movement guided by the elongated hole. A stop position can denote a position in which a further upward movement is mechanically blocked, e.g. because the upper end section or the aforementioned guided element contacts an edge of the elongated guiding slot, in particular a front-sided or rear-sided edge. In the stop position, a further movement of the upper end section in one direction of the linear movement is prevented or blocked. In particular, a further movement of the upper end section which would provide a further upward movement of the movable part is prevented or blocked. This advantageously provides a reliable and easy-to-construct limitation of the upward movement of the movable part.

In another embodiment, an upper end section of at least one scissor leg element is in an intermediate position if the movable part is in the retracted state. The intermediate position can denote a position of the movement guided by the elongated hole. Within the intermediate position, the movement of the upper end section in and against the direction of the linear movement is unblocked. This can mean that the upper end section can be moved such that the movable part is moved upwards. Further, the upper end section could theoretically be moved such that the movable part is moved downwards in the retracted state. This further downward movement is, however, can be blocked, e.g. by other stop elements. In the intermediate position, the upper end section does not contact a front-sided or a rear-sided edge of the elongated guiding slot.

This advantageously allows a shearing movement of the movable part, in particular if an ice layer covers the movable part in the retracted state. In other words, it is possible that one portion of the movable part, e.g. a right or a left half of the movable part executes a limited upward and horizontal movement, wherein the remaining part remains in the retracted state. This, in turn, advantageously simplifies to clear the mechanical blockage of the movable part due to icing and/or soiling.

In another embodiment, a central connecting element couples a first and a further scissor arrangement of the scissor lift means. The central connecting element can e.g. be designed as a connecting rod. Scissor leg elements of each of the scissor arrangements can be movably coupled to the central connecting element. Providing a central connecting element advantageously stabilizes the scissor lift mechanism. The central connecting element can e.g. be a rigid element.

In a preferred embodiment, a driving unit is rigidly connected to the central connecting element, wherein at least one output shaft of the driving unit is coupled to at least one scissor leg element of one scissor arrangement. That the driving unit is rigidly connected to the central connecting element can mean that there is no relative movement between the connecting element and the driving unit. The driving unit can provide the actuating means or can be a part thereof. Preferably, the driving unit is provided by an electric machine, in particular a servo motor. The driving unit can have two output shafts, wherein one of the output shafts is coupled to one scissor leg element of a first scissor arrangement, wherein the other output shaft is coupled to one scissor leg element of the remaining scissor arrangement.

The driving unit can be coupled to at least one scissor leg element by a gear unit, in particular a gear wheel unit.

Such a design of the power transfer pad advantageously reduces a required building space for integrating the actuating means into the power transfer pad.

In another embodiment, an output shaft of a driving unit is coupled to the central connecting element. The driving unit can e.g. be a linear actuator or provide a part thereof.

It is possible that the output shaft is part of or provides a self-locking coupling or transmission means between the driving unit and the movable part.

It is also possible that the braking means is provided by the driving unit or by a unit separate from the driving unit. A braking force provided or generated by the braking means can be exerted on a shaft which is moved by the driving unit. In case of a linear actuator, the output shaft can exert a linear movement in order to provide a movement of the movable part.

This advantageously allows a simple design of the inductive power transfer pad.

In another embodiment, the actuating means comprises an overload protection. The overload protection can be an electrical or, preferably, a mechanical overload protection. The overload protection can e.g. release a downward movement of the movable part if a load applied to the movable part is higher than a predetermined threshold value. In this case, the movable part can e.g. exert a downward movement if a tire of a vehicle accidentally drives on the movable part. The driving unit can be coupled to the scissor leg element by an overload protection unit or provide an overload protection function.

Thus, an operational safety of the power transfer pad is increased.

In another embodiment, the actuating means comprises a load torque protection. The load torque protection can be an electrical or mechanical load torque protection. In particular, a free-wheeling of the output shafts of the driving unit can be activated if the driving force or torque provided by the actuating means, e.g. the driving unit, is higher than a predetermined threshold value. The driving unit can be coupled to the scissor leg element by a load torque protection unit or provide a load torque protection function. This advantageously reduces the risk of overloading the driving unit, e.g. in the case that a heavy weight is located on the movable part which cannot be lifted by the driving unit.

In another embodiment, the inductive power transfer pad comprises a damping unit. The damping unit can provide a damping of the movement of the output shaft/s or of the upward and/or downward movement of the movable part. The damping unit can be provided by a self-locking actuating means, in particular by a self-locking driving unit, or by a unit separate from the driving unit. The damping unit can e.g. be arranged convolute around the lifting mechanism. Damping the movement advantageously allows providing pinch protection in case of a power failure and/or a failure of a sensor-based pinch protection.

It is also possible that the driving unit is a non-self-locking unit. This advantageously ensures a high efficiency of the driving unit. The driving unit, however, can comprise a braking means to prevent a downward movement after the driving unit stops to operate. This braking means can be an active or a passive braking means, e.g. a mechanical (spring) element. This advantageously prevents the movable part from being stuck in the extended position, when for example the vehicle in the charging position lowers its vehicle clearance while the charging takes place.

In a preferred embodiment, the central connecting element and each scissor leg element of a scissor arrangement is connected via a sliding block connection. It is possible that the central connecting element provides at least one sliding element, e.g. at each end of the connecting element. The sliding element can be provided by the central connecting element itself or by an element connected to the central connecting element. Further, the sliding block connection can comprise a guiding means, wherein a movement of the sliding element is guided by said guiding means. The guiding means can e.g. be provided by a recess or opening in a scissor leg element. Via the sliding block connection, the central connecting element is movably connected or coupled to each scissor leg element. This advantageously provides a mechanically stable scissor lift means which is connected to the movable part via floating bearings and which reliably guides the movement of the movable part.

In another embodiment, each scissor leg element of a scissor arrangement has a guiding slot for guiding an end section of the central connecting element. The guiding slot can be part of the sliding block connection. The guiding slot allows relative movement between the scissor leg elements and the central connecting element which occurs during the movement of the movable part as the movable part is connected to the scissor leg elements by floating bearings. Thus, the guiding slot advantageously provides a stable scissor lift means and allows the movement of the movable part in case of the floating connection of the scissor leg elements to the movable part. The guiding slot thus provides a functionality of the floating bearings at the moveable part.

In a preferred embodiment, the guiding slot is a curved slot. In particular, the guiding slot can be a part-circle-shaped slot.

The part-circle-shaped slot can have a predetermined radius. The curved slot advantageously ensures that a torque or force generated by the driving unit for the upward and downward movement does not vary more than a predetermined amount during the upward or downward movement of the movable part.

In another embodiment, the central connecting element is connected to the movable part by the at least one spring element. This can mean that one end of the spring element, e.g. a spiral spring, is attached to the central connecting element, wherein another end of the spring element is attached to the movable part. The ends of the spring element can be pivotally connected to the central connecting element and to the movable part.

Preferably, the central connecting element is connected to the stationary part by the at least one spring element. This can mean that one end of the spring element, e.g. a spiral spring, is attached to the central connecting element, wherein another end of the spring element is attached to the stationary part. The ends of the spring element can be pivotally connected to the central connecting element and to the stationary part.

The spring element can be designed and/or arranged such that the spring element relaxes if the movable part is moved upwards, wherein the spring element tenses if the movable part is moved downwards. A spring force generated by the spring element can be a centering force, wherein the centering force is generated such that the movable part is centered with respect to the central connecting element. In particular, the spring element can be designed and/or arranged such that the central connecting element is centered in the guiding slots of the scissor leg elements during the upward and downward movement of the movable part.

Further, the spring element can be designed and/or arranged such that a smooth and uniform lifting movement of the movable part is provided.

This advantageously allows a simple installation of the spring element while the aforementioned holding force/torque for holding the position of the movable part can be provided.

In another embodiment, each end section of the central connecting element is connected to the movable part by two spring elements, e.g. two spiral springs. Further, one of the spring elements is connected to a first half of the movable part, wherein the remaining spring element is connected to the remaining half of the movable part. In particular, each spring element can be connected to the movable part in the area or vicinity of another floating bearing. A half of the movable part can denote a portion of the movable part which comprises one floating bearing for one of the scissor leg elements of a scissor arrangement, wherein the remaining part comprises the remaining floating bearing for the remaining scissor leg element of said scissor arrangement. Both halves can have the same size.

This advantageously improves the aforementioned centering of the movable part relative to the central connecting element during an upward and downward movement.

In another embodiment, the power transfer pad comprises a movement supporting spring element, wherein at least one part, e.g. a first end, of the movement supporting spring element is connected or attached to the stationary part. Further, the movement supporting spring element is pre-tensioned if the movable part is in a retracted state. The movement supporting spring element is designed and/or arranged such that it relaxes if the movable part is moved to the extended state. This advantageously supports the upward movement, as the movement supporting spring element can exert a supporting spring force which is directed at least partially in the first direction, wherein said force can support the upward movement. Additionally, the downward movement can be slowed down by the increasing spring force during the downward movement.

In another embodiment, the movement supporting spring element is provided by a yoke spring. An axis of rotation of the yoke spring can be arranged on or within the stationary part. Further, the axis of rotation can be oriented parallel to the central connecting element. Using a yoke spring advantageously provides a non-uniform supporting spring force during the upward movement. As the maximum force for driving the scissor lift means or the movable part can be needed in the retracted state and can decrease during the upward movement, the supporting force or supporting spring force provided by the yoke spring is advantageously adapted to such a force profile.

In another embodiment, the stationary part has at least one element of a form-fit connection with the movable part, wherein the form-fit connection is provided if the movable part is in the retracted state. This advantageously reduces the probability of an undesired relative movement between the stationary and the movable part in the retracted state.

In another embodiment, the movable part has at least one element of a form-fit connection with the stationary part, wherein the form-fit connection is provided if the movable part is in the retracted state. The at least one element of the form-fit connection can be a called corresponding element of the element providing the form-fit connection of the stationary part.

In another embodiment, the at least one form-fit element of the stationary part is provided by a recess within or by a projection on an upper surface of a base plate of the stationary part, wherein the corresponding form-fit element of the movable part is provided by a projection on or by a recess within a lower surface of the movable part. This advantageously provides a simple design of the form-fit elements.

In another embodiment, inner scissor leg elements of two scissor arrangements are connected by a stiffening rod. This advantageously increases a stability of the scissor lift means.

Further proposed is a method of operating a power transfer pad according to one of the embodiments described in this disclosure. The movable part of the power transfer pad is moved at least in a first direction. Further, the movable part can also be moved against the first direction. In particular, an actuating means, in particular the disclosed driving unit, can be controlled such that the movable part is moved upwards or downwards. The actuating means can e.g. exert a driving force or driving torque on the movable part or on at least one element of the scissor lift means.

BRIEF DESCRIPTION OF THE DRAWINGS

The invention will be disclosed with reference to the attached figures. The figures show.

DESCRIPTION OF THE INVENTION

Figure 1:
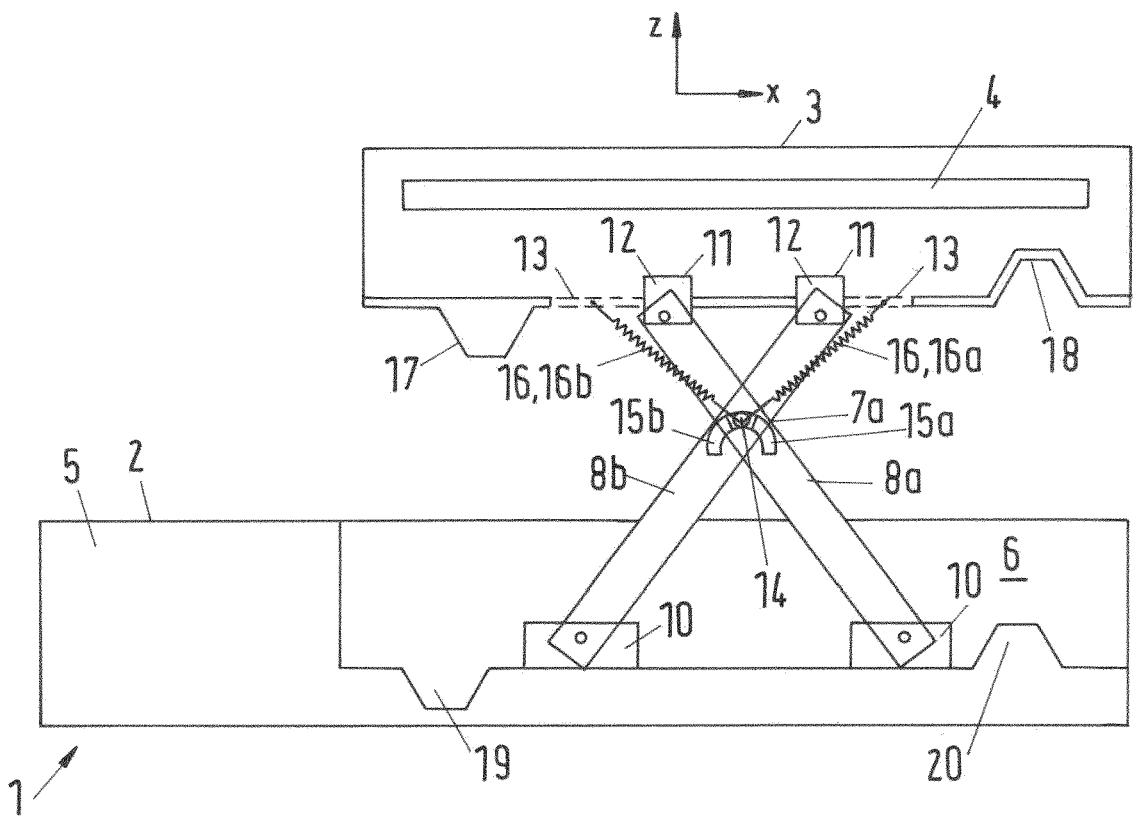
FIG. 1 a schematic longitudinal section of an inductive power transfer pad.

In the following, the same reference numerals denote elements with the same or similar technical features.

FIG. 1 shows a schematic longitudinal section of an inductive power transfer pad 1. The inductive power transfer pad 1 comprises a stationary part 2 and a movable part 3. The movable part 3 comprises a primary winding structure 4 which is arranged within a housing of the movable part 3. The movable part 3 has the shape of a plate.

The stationary part 2 comprises a housing section 5 and further provides a recess 6. The movable part 3 can be arranged within the recess 6 in a retracted state of the movable part 3. In FIG. 1, the movable part 3 is shown in an extended state. In the retracted state, an upper surface of the housing section 5 of the stationary part 2 can be arranged within the same plane as an upper surface of the movable part.

Within the housing section 5 of the stationary part 2, a converter (not shown) can be arranged. DC input terminals of the converter can be connected to a DC terminal of the stationary part 2. Further, a transmitter-receiver-device for establishing a communication link to external devices and a control unit (not shown) can be arranged within the housing section 5 of the stationary part 2. The control unit can control a movement of the movable part 3 and an operation of the converter. It is, of course, possible to provide multiple control units for different control operations.

Further, compensating elements (not shown) for compensating a reactance of a primary winding structure 4 and filter elements for filtering an output voltage/current of the converter can be arranged within the housing section 5 of the stationary part 2. The housing section 5 of the stationary part 2 protects the elements arranged within the housing section 5, e.g. from dirt or water even if the movable part 3 is moved out of the recess 6, e.g. into the extended state. Not shown are electric connecting means for connecting the converter, e.g. AC terminals of the converter, and the primary winding structure 4.

Further, the movable part 3 is movable in and against a vertical direction z. An arrow head of the vertical direction z indicates an upward direction. The vertical direction z can e.g. be oriented parallel to a direction of a gravitational force, wherein the vertical direction is directed from bottom to top if it is oppositely oriented to the direction of the gravitational force. Also, the vertical direction can be oriented from bottom to top if it is oriented from the inductive power transfer pad 1 towards a vehicle (not shown).

The inductive power transfer pad 1 shown in FIG. 1 can be installed on the surface of the route or can be embedded within the surface of the route.

Figure 2:
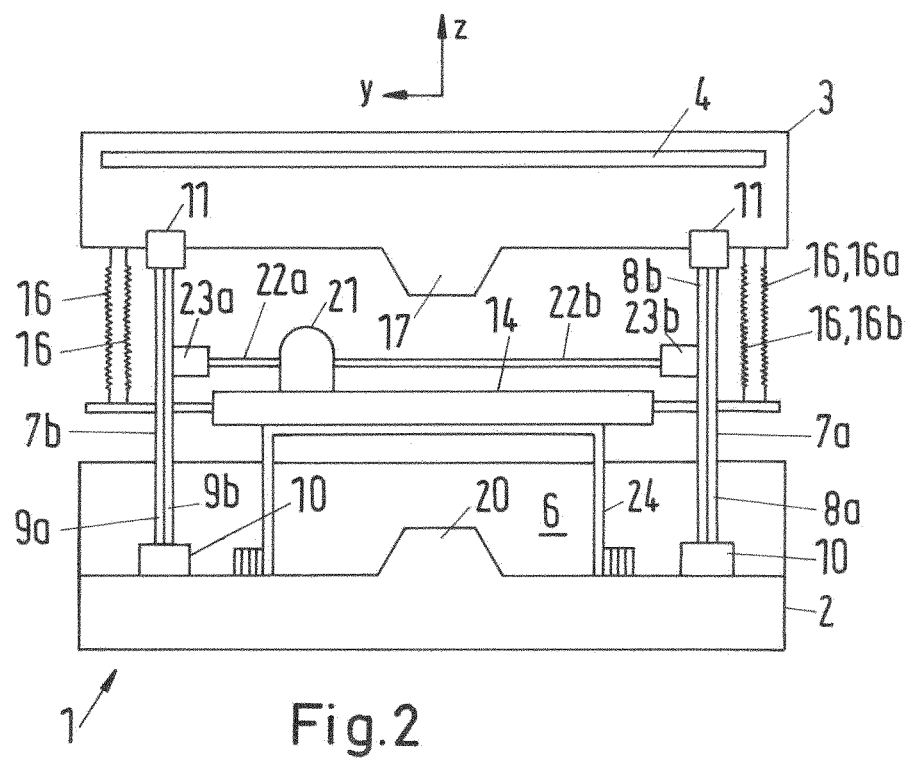
FIG. 2 a schematic cross section of the inductive power transfer pad shown in FIG. 1, FIG. 3 a schematic perspective view of an inductive power transfer pad, FIG. 4 a schematic longitudinal section of an inductive power transfer pad according to another embodiment, FIG. 5 a schematic top view of a stationary part of an inductive power transfer pad, and FIG. 6 a schematic longitudinal section of the stationary part shown in FIG. 5.

The inductive power transfer pad 1 comprises a scissor lift means, wherein the scissor lift means comprises a first scissor arrangement 7a and a second scissor arrangement 7b (see FIG. 2). The first scissor arrangement 7a comprises a first outer scissor leg 8a and a second inner scissor leg 8b. The second scissor arrangement 7b (see FIG. 2) also comprises a first outer scissor leg 9a and a second inner scissor leg 9b.

The scissor arrangements 7a, 7b are connected to the stationary part 2 via fixed bearings 10. Further, the scissor arrangements 7a, 7b are connected to the movable part 3 via floating bearings 11.

In particular, a first, lower end section of the scissor legs 8a, 8b, 9a, 9b are pivotally connected to a fixed bearing 10. Thus, the fixed bearing 10 prevent a translational movement of the lower end sections of the scissor legs 8a, 8b, 9a, 9b. Further, the fixed bearings 10 allow a rotational movement, in particular around an axis of rotation which is oriented parallel to a lateral direction y (see FIG. 2). In particular, no translational movement along or against a direction parallel to a longitudinal direction x is allowed by the fixed bearings 10. The longitudinal direction x and the lateral direction y are both oriented perpendicular to the vertical direction z and perpendicular to each other.

Second, upper end sections of the scissor legs 8a, 8b, 9a, 9b are pivotally connected to a sliding element 12. The sliding element 12 is arranged within an elongated hole 13 which is provided within a bottom part, e.g. a base plate, of the movable part 3. Each floating bearing 11 is provided by a sliding element 12 and the elongated hole 13 in which it is arranged. A floating bearing 11 allows a translational movement of the second, upper end sections of the scissor legs 8a, 8b, 9a, 9b in or against the longitudinal direction x.

If the movable part 3 is moved downwards, either the sliding elements 12 will be moved towards outer edge sections of the elongated holes 13 or the joint bolts 12b that can act like sliders are the sliding elements and are able to slide translational within elongated hole 13. If the movable part 3 is moved upwards, the sliding elements 12 will be moved towards inner edge sections of the elongated holes 13.

FIG. 1 shows that the scissor legs 8a, 8b are each in a stop position if the movable part 3 is in the extended state. In the stop position, the sliding elements 12 contact inner edge sections of the elongated holes 13. Thus, a further upward movement is prevented.

It is further possible that the upper end sections of the scissor legs 8a, 8b, in particular the sliding elements 12, are positioned in an intermediate position with respect to the elongated holes 13 if the movable part 3 is in the retracted state. This means that in the retracted state, the sliding elements 12 do not contact the inner or the outer edge sections of the elongated holes 13. The inner and outer edge sections denote inner and outer edge sections with respect to the edges of the movable part 3.

Further shown is a central connecting rod 14 which connects the first and the second scissor arrangement 7a, 7b. Each scissor leg 8a, 8b has a part-circle-shaped guiding slot 15a, 15b, wherein the first guiding slot 15a is the guiding slot of the first scissor leg 8a and the second guiding slot 15b is the guiding slot of the second scissor leg 8b. It is shown at an end section of the central connecting rod 14 is slidably arranged within the guiding slots 15a, 15b. The end section can slide within the guiding slots 15a, 15b. As a result, the scissor legs 8a, 8b are movably connected to the central connecting rod 14.

Further shown are spiral springs 16, wherein a first end of a spiral spring 16 is connected to an end section of the central connecting rod 14. Another end of the spiral spring 16 is connected to the movable part 3, in particular to a base plate 25 of the movable part 3 (see FIG. 3). FIG. 1 shows that a first spiral spring 16a connects the central connecting rod 14 to the movable part 3 in the vicinity of the elongated hole 13 which guides the movement of the upper end section of the second scissor leg 8b. A second spiral spring 16b connects the central connecting rod 14 to the movable part 3 in the vicinity of the elongated hole 13 which guides the movement of the upper end section of the first scissor leg 8a.

During a downward movement of the movable part 3, the spiral springs 16 will be extended. The spring force generated by this extension centers the movable part 3 with respect to the central connecting rod 14. The spiral springs 16 are centering the movable part during movement and at all height levels.

FIG. 1 further shows that the movable part 3, in particular a base plate of the movable part 3, has a cone-shaped projection 17 and a cone-shaped recess 18.

The stationary part 2, in particular a base plate of the recess 6 of the stationary part 2, has a cone-shaped recess 19 and a cone-shaped projection 20. If the movable part 3 is moved into the retracted state, the cone-shaped projection 17 of the movable part will be arranged within the cone-shaped recess 19 of the stationary part 2, wherein a form-fit connection is provided. Also, the cone-shaped projection 20 of the stationary part 2 will be arranged within the cone-shaped recess 18 of the movable part 3 if the movable part 3 is moved into the retracted state. This also provides a form-fit connection in the retracted state.

Figure 3:
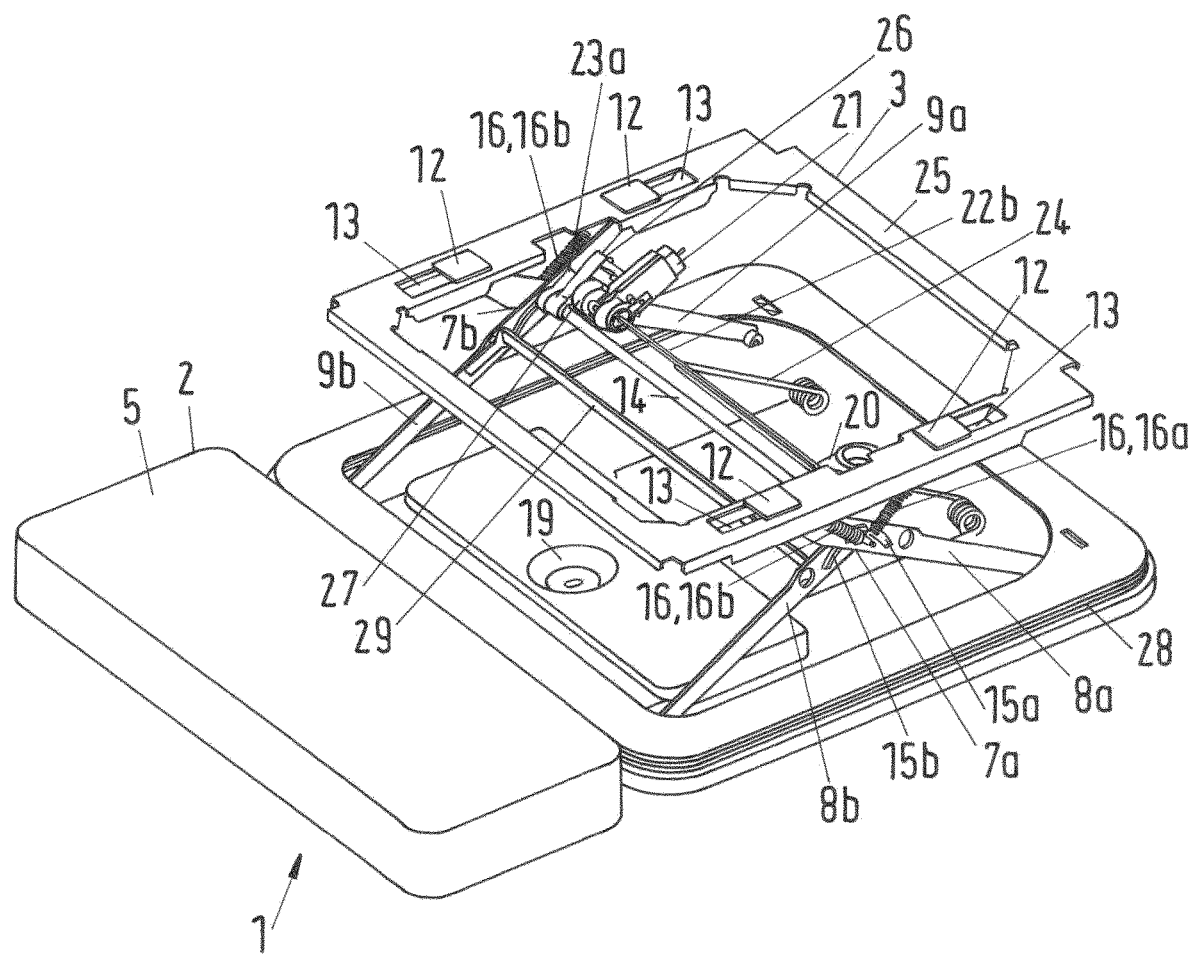

A bellow 28 (as shown in FIG. 3) encloses the volume between the movable part 3 and the stationary part 2, in particular the volume under the movable part 3. The bellow 28 protects the scissor lift means against dust and pollution.

FIG. 2 shows a schematic cross section of the inductive power transfer pad 1 shown in FIG. 1. Shown is the stationary part 2, in particular the recess 6 provided by the stationary part 2. Also shown is the movable part 3 in the extended state.

Further shown is the central connecting rod 14. A driving unit 21, in particular an electric machine, is rigidly connected to the central connecting rod 14. The driving unit 21 has a first output shaft 22a and a further output shaft 22b. The first output shaft 22a is coupled to the second, inner scissor leg 9b of the second scissor arrangement 7b by a first gear unit 23a. The first gear unit 23a can be designed as a gear wheel unit. Further, the further output shaft 22b is coupled to the second inner leg 8b of the first scissor arrangement 7a by a further gear unit 23b. The further gear unit 23b can also be designed as a gear wheel unit.

The gear units 23a, 23b can be connected to a central connecting rod 14.

If the driving unit 21 rotates the first and the second output shaft 22a, 22b, the second, inner legs 8b, 9b of the scissor arrangements 7a, 7b will be rotated relative to the central connecting rod 14. During the rotational movement, end sections of the central connecting rod 14 will slide within the guiding slots 15a, 15b of the scissor legs 8a, 8b, 9a, 9b. Depending on a turning direction of the rotational movement of the output shafts 22a, 22b, an upward or downward movement of the movable part 3 is generated.

The driving unit 21 and/or the transmission path of a force/torque generated by the driving unit 21 to the legs 8b, 9b comprising the output shafts 22a, 22b and the gear units 23a, 23b can provide a self-locking effect. This means that a holding force/torque is provided by driving unit 21 and/or the transmission path in a standstill of the movable part 3.

Further shown is a yoke spring 24 which is arranged in or on the stationary part 2, in particular on a base plate of the recess 6 provided by the stationary part 2. If the movable part 3 is moved downwards, the central connecting rod 14 contacts the bracket section of the yoke spring 24 and forces the yoke spring into a tensioned state. If the movable part 3 is moved upwards from the retracted state, the spring force provided by the yoke spring 24 supports the upward movement. In particular, the yoke spring 24 relaxes during the upward movement. In the extended state, the yoke spring 24 can be fully or only partially relaxed.

FIG. 3 shows a perspective view of an inductive power transfer pad 1 with a stationary part 2 and a movable part 3, wherein only a base plate 25 of the movable part 3 is shown. The base plate 25 provides the elongated holes 13, wherein sliding elements 12 connected to the scissor legs 8a, 8b, 9a, 9b are movably arranged within the elongated guiding slots 13.

Further shown are the scissor arrangements 7a, 7b which comprise scissor legs 8a, 8b, 9a, 9b. Also shown is the central connecting rod 14, wherein a driving unit 21 is rigidly connected to the central connecting rod 14 by a holding device 26.

Further shown is a gear unit 23a which mechanically couples a first output shaft (not shown) of the driving unit 21 to the first, inner leg 9b of the second scissor arrangement 7b. Further shown is an overload protection unit 27, wherein the driving unit 21, in particular the first output shaft 22a, is coupled to the second, inner scissor leg 9b of the second scissor arrangement 7b by the overload protection unit 27 and the gear unit 23a.

Further shown is a second output shaft 22b, wherein the second output shaft 22b can be coupled to the second inner scissor leg 9b of the first scissor arrangement by another gear unit 23b (see FIG. 2) and another overload protection unit (not shown).

Indicated is also a bellow 28 which is attached to the base plate 25 of the movable part 3 and an edge section of the stationary part 2, in particular to edge sections of the base plate of the recess 6 provided by the stationary part 2. The bellow 28 is used to protect the scissor lift means and prevent dirt accumulation to the area inside the bellow.

Further shown is a stiffening rod 29 which connects the second, inner leg 8b of the first scissor arrangement 7a and the second, inner leg 9b of the second scissor arrangement 7b. The stiffening rod 29 is rigidly connected to the scissor legs 8b, 9b.

Further indicated are part-circle-shaped slots 15a, 15b of the scissor legs 8a, 8b. All scissor legs 8a, 8b, 9a, 9b can be designed as common parts.

Figure 4:
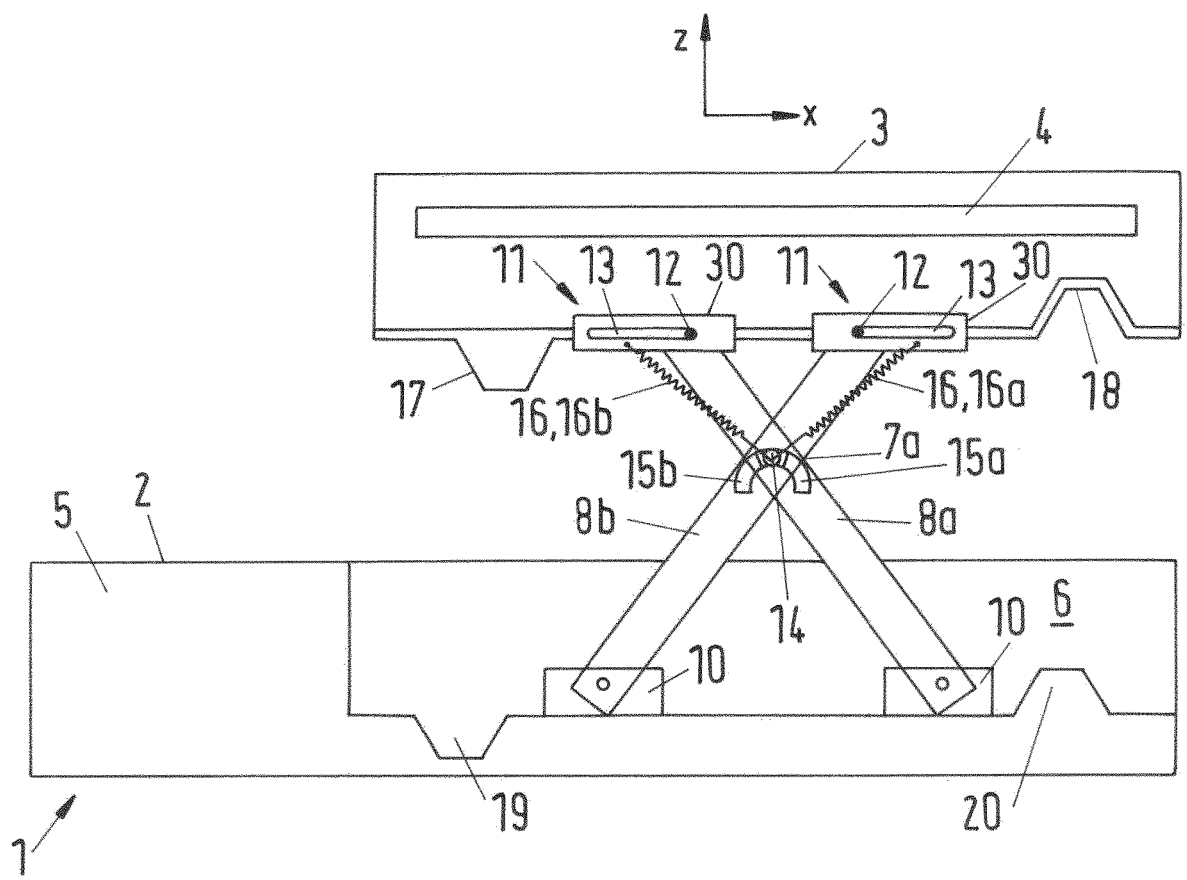

FIG. 4 shows a schematic longitudinal section of an inductive power transfer pad 1 according to another embodiment. Except for constructional differences which will be explained below, the inductive power transfer pad 1 shown in FIG. 4 is designed as the inductive power transfer pad 1 shown in FIG. 1. In contrast to the embodiment shown in FIG. 1, a fixed block element 30 is attached to the movable part 3 or provided by the movable part 3. The fixed block element 30 has or provides an elongated hole 13.

A sliding element 12 which is designed as a pin is connected to an upper end section of each scissor leg 8a, 8b, 9a, 9b, respectively. The sliding element 12 is further arranged within the elongated hole 13. The sliding element 13 can execute a linear movement within the elongated hole 13.

Further, a first spiral spring 16a connects the central connecting rod 14 to a first fixed block element 30, wherein a second spiral spring 16b connects the central connecting rod 14 to a second fixed block element 30.

By using fixed block elements 30, the material pairing can be improved. The fixed block element 30 can be made from the same material as the sliding element 12, allowing for a reduced friction between the elongated hole 13 of the fixed block element 30 and the sliding element 12.

FIG. 4 also shows that the scissor legs 8a, 8b are each in a stop position if the movable part 3 is in the extended state.

Figure 5:
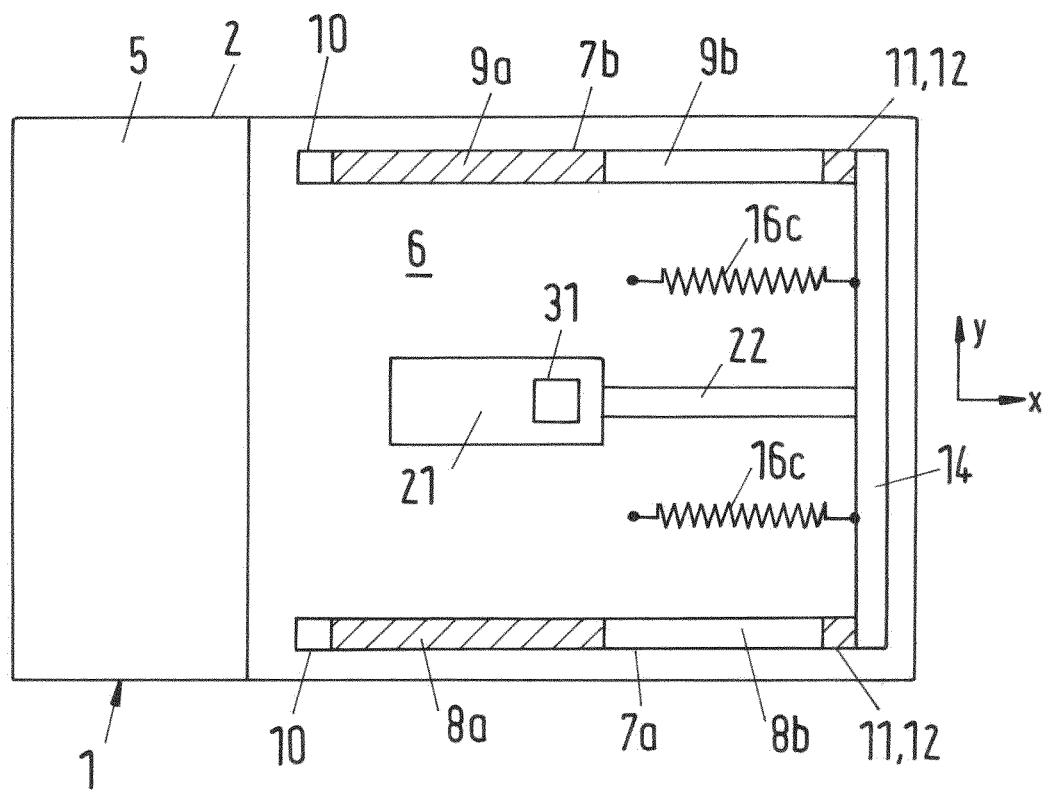

FIG. 5 shows a schematic top view of an inductive power transfer pad 1, in particular of the stationary part 2. Not shown is the movable part 3 (see FIG. 6). Again, the stationary part 2 comprises a housing section 5 and provides a recess 6. Further shown is that the inductive power transfer pad 1 comprises a scissor lift means, wherein the scissor lift means comprises a first scissor arrangement 7a and a second scissor arrangement 7b.

The first scissor arrangement 7a comprises a first scissor leg 8a and a second scissor leg 8b. The scissor legs 8a, 8b are designed and arranged such that the first scissor leg 8a extends through an opening provided in a central section of the second scissor leg 8b. A first, lower end section of the first scissor leg 8a is pivotally connected to a sliding element 12 (see FIG. 6). The sliding element 12 can be arranged within an elongated hole 13 provided within a bottom part, e.g. a base plate, of the stationary part 2. Thus, the first, lower end section of the first scissor leg 8a is connected to the stationary part 2 by a floating bearing 11. The first, lower end section of the second scissor leg 8b is pivotally connected to a fixed bearing 10. Thus, the first, lower end section of the second scissor leg 8b is connected to the stationary part 2 by a fixed bearing 10.

The second scissor arrangement 7b comprises a first scissor leg 9a and a second scissor leg 9b. The scissor legs 9a, 9b are designed and arranged such that the first scissor leg 9a extends through an opening provided in a central section of the second scissor leg 9b. A first, lower end section of the first scissor leg 9a is pivotally connected to a sliding element 12. The sliding element 12 can be arranged within an elongated hole 13 provided within a bottom part, e.g. a base plate, of the stationary part 2. Thus, the first, lower end section of the first scissor leg 9a is connected to the stationary part 2 by a floating bearing 11. The first, lower end section of the second scissor leg 9b is pivotally connected to a fixed bearing 10. Thus, the first, lower end section of the second scissor leg 9b is connected to the stationary part 2 by a fixed bearing 10.

Further shown is a driving unit 21 which is provided by a linear actuator. The linear actuator 21 exerts a driving force on an output shaft 22. Via the linear actuator, the output shaft 22 can be moved along and against the longitudinal direction x. The output shaft 22 is mechanically connected, in particular rigidly connected to a central connecting element 14 which provides a rigid connecting element. The central connecting element 14 couples the first and the second scissor arrangement 7a, 7b, in particular the lower end sections of the first scissor legs 8a, 9a of the respective scissor arrangements 7a, 7b. Via this mechanical connection, a linear actuator provided by the driving unit 21 can move the lower ends of said scissor leg elements 8a, 9a along and against the longitudinal direction x. If the lower end sections of the scissor leg elements 8a, 9a are moved against the longitudinal direction, the movable part 3 (see FIG. 6) will be moved from the retracted into the extended state. Further, if the lower end sections of the scissor leg elements 8a, 9a are moved along the longitudinal direction x, the movable part 3 will be moved from the extended into the retracted state.

The driving unit 21 and/or the transmission path of a force/torque generated by the driving unit 21 to scissor legs 8a, 9a comprising the output shaft 22 and the central connecting element 14 can provide a self-locking effect.

It is further shown that the central connecting element 14 is connected to the stationary part 2, in particular to a bottom plate of the stationary 2 by spring elements 16c. These spring elements 16c are designed as spiral spring elements. A first end of said spring elements 16c is connected to the stationary part 2, wherein another end of said spring elements 16c is connected to the central connecting element 14.

Further indicated is a braking means 31 which can exert the braking force, in particular a constant braking force, on the output shaft 22. The braking force can be directed against the moving section of the output shaft. It is possible that the braking means provides the self-locking effect or at least a portion thereof.

It is possible that the spring elements 16c are designed and/or arranged such that the spring elements 16c adopt a tensioned state if the movable part 3 is in the retracted state. In this case, spring elements 16c will exert a spring force on the connecting element 14 and thus on the lower end sections of the first scissor leg elements 8a, 9a which is directed against the longitudinal direction x.

Further, the spring elements 16c can be arranged and/or designed such that said spring force is smaller than the braking force on the output shaft 22 provided by the braking means 31 and the force provided by the gravitational force of the movable part 3. This means that no movement of the movable part 3 will occur due to the spring force provided by the spring elements 16c in the retracted state of the movable part 3.

If it is, however, desired to move the movable part 3 from the retracted state towards the extended state, the driving unit 21 will be supported by the spring force exerted by the spring elements 16c. In particular, a driving force generated by the driving unit 21 and exerted on the output shaft 22 is smaller than in the case without spring elements 16c.

Further, the spring elements 16c and, if applicable, the braking means 31, can be designed and/or arranged such that in each position of the movable part 3 between and including the position in the retracted and the extended state, the position can be held without operating the driving unit 21, e. g. without generating a driving force/torque. In particular, the spring elements 16c have to be arranged and/or designed such in each position of the movable part 3, the generated spring force, the braking force generated by the braking means 31 and the gravitational force of the movable part 3 superpose such that there is no movement of the movable part 3, in particular no upward and no downward movement.

Figure 6:
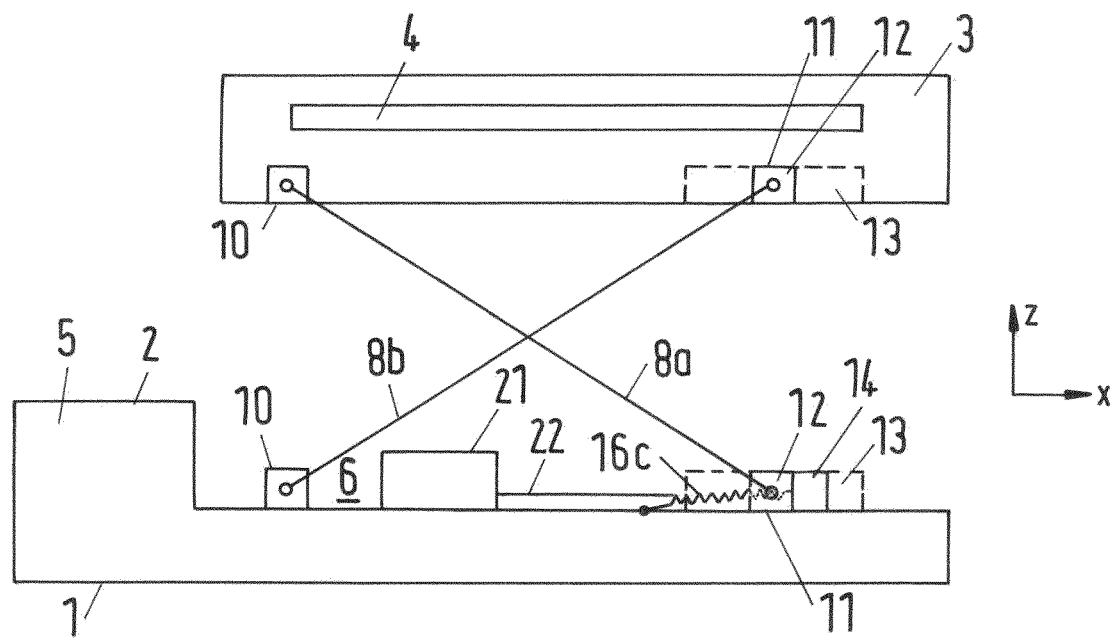

FIG. 6 shows a schematic longitudinal section of the inductive power transfer pad shown in FIG. 5. It is shown that an upper end section of the first scissor leg 8a, 9a can be pivotally connected to a fixed bearing of the movable part 3. Further, the upper end sections of the second scissor legs 8b, 9b can be pivotally connected to a sliding element 12, wherein the sliding element 12 is arranged within an elongated hole 13 (see FIG. 1) which is provided within a bottom part, e.g. a base plate, of the movable part 3.

The invention claimed is:

1. An inductive power transfer pad, comprising a stationary part and a movable part, wherein the movable part comprises a primary winding structure, wherein the inductive power transfer pad comprises at least one actuating means, wherein the movable part is movable at least in a first direction by the at least one actuating means, wherein the inductive power transfer pad comprises a scissor lift means, wherein the movable part and the stationary part are coupled by the scissor lift means, wherein a scissor arrangement of the scissor lift means is coupled to the stationary part by at least one fixed bearing, wherein the scissor arrangement is coupled to the movable part by at least one floating bearing,
wherein the actuating means is designed as a self-locking actuating means, and
wherein the inductive power transfer pad comprises at least one spring element, wherein the at least one spring element is part of a coupling between the movable part and the stationary part.

2. The power transfer pad according to claim 1, wherein at least one section of the scissor lift means is connected to the stationary part or to the movable part by the at least one spring element.

3. The power transfer pad according to claim 1, wherein the at least one actuating means comprises at least one braking means for a movable part of the actuating means.

4. The power transfer pad according to claim 1, wherein the at least one spring element is arranged and/or designed such that the movable part is holdable in selected or all positions of the movable part without operating the actuating means.

5. The power transfer pad according to claim 3, wherein the at least one spring element and the at least one braking means are arranged and/or designed such that the movable part is holdable in selected or all positions of the movable part without operating the actuating means.

6. The power transfer pad according to claim 1, wherein the floating bearing is at least partially provided by an elongated hole within the movable part for guiding a movement of an upper end section of a scissor leg element.

7. The power transfer pad according to claim 1, wherein an upper end section of at least one scissor leg element is in a stop position if the movable part is in an extended state.

8. The power transfer pad according to claim 1, wherein an upper end section of at least one scissor leg element is in an intermediate position if the movable part is in a retracted state.

9. The power transfer pad according to claim 1, wherein a central connecting element couples a first and a further scissor arrangement.

10. The power transfer pad according to claim 9, wherein a driving unit is rigidly connected to the central connecting element, wherein at least one output shaft of the driving unit is coupled to at least one scissor leg element of one scissor arrangement.

11. The power transfer pad according to claim 9, wherein an output shaft of a driving unit is coupled to the central connecting element.

12. The power transfer pad according to claim 1, wherein the actuating means comprises an overload protection.

13. The power transfer pad according to claim 1, wherein the actuating means comprises a load torque protection.

14. The power transfer pad according to claim 1, wherein the inductive power transfer pad comprises a damping unit.

15. The power transfer pad according to claim 9, wherein the central connecting element and each scissor leg element of a scissor arrangement is connected via a sliding block connection.

16. The power transfer pad according to claim 9, wherein each scissor leg element of a scissor arrangement has a guiding slot for guiding an end section of the central connecting element.

17. The power transfer pad according to claim 16, wherein each guiding slot is a curved slot.

18. The power transfer pad according to claim 9, wherein the central connecting element is connected to the movable part by the at least one spring element or the central connecting element is connected to the stationary part by the at least one spring element.

19. The power transfer pad according to claim 18, wherein each end section of the central connecting element is connected to the movable part by two spring elements, wherein one of the spring elements is connected to a first half of the movable part, wherein the remaining spring element is connected to the remaining half of the movable part.

20. The power transfer pad according to claim 1, wherein the inductive power transfer pad comprises a movement supporting spring element, wherein at least one part of the movement supporting spring element is connected to the stationary part, wherein the movement supporting spring element is pre-tensioned if the movable part is in a retracted state, wherein the movement supporting spring element relaxes if the movable part is moved to an extended state.

21. The power transfer pad according to claim 20, wherein the movement supporting spring element is provided by a yoke spring.

22. The power transfer pad according to claim 1, wherein the stationary part has at least one element of a form-fit connection with the movable part, wherein the form-fit connection is provided if the movable part is in a retracted state.

23. The power transfer pad according to claim 1, wherein the movable part has at least one element of a form-fit connection with the stationary part, wherein the form-fit connection is provided if the movable part is in a retracted state.

24. The power transfer pad according to claim 22, wherein the at least one form-fit element of the stationary part is provided by a recess within or by a projection on an upper surface of a base plate of the stationary part, wherein the corresponding form-fit element of the movable part is provided by a projection on or by a recess within a lower surface of the movable part.

25. The power transfer pad according to claim 1, wherein inner scissor leg elements of two scissor arrangements are connected by a stiffening rod.

26. A method of operating the inductive power transfer pad according to claim 1, comprising:
    moving the movable part at least in a first direction.

* * * * *